United States Patent [19]
Carney et al.

[11] Patent Number: 5,446,447
[45] Date of Patent: Aug. 29, 1995

[54] RF TAGGING SYSTEM INCLUDING RF TAGS WITH VARIABLE FREQUENCY RESONANT CIRCUITS

[75] Inventors: Scott N. Carney, Palatine, Ill.; George L. Lauro, San Jose, Calif.; Eric L. Krenz, Crystal Lake; Sanjar Ghaem, Palatine, both of Ill.

[73] Assignee: Motorola, Inc., Schaumburg, Ill.

[21] Appl. No.: 195,681

[22] Filed: Feb. 16, 1994

[51] Int. Cl.⁶ .................................... G08B 13/14
[52] U.S. Cl. ................... 340/572; 340/825.54; 340/825.71; 340/505
[58] Field of Search ............ 340/572, 825.54, 825.62, 340/825.68, 825.71, 825.73, 505

[56] References Cited

U.S. PATENT DOCUMENTS

| | | | |
|---|---|---|---|
| 3,944,928 | 3/1976 | Augenblick et al. | 340/572 |
| 4,857,893 | 8/1989 | Carroll | 340/572 |
| 5,021,767 | 6/1991 | Fockens et al. | 340/572 |
| 5,121,106 | 6/1992 | Kataria et al. | 340/572 |
| 5,241,298 | 8/1993 | Lian et al. | 340/572 |

Primary Examiner—John K. Peng
Assistant Examiner—Benjamin C. Lee
Attorney, Agent, or Firm—Phillip H. Melamed

[57] ABSTRACT

An RF tagging system which provides a large number of potential identification codes without increasing the physical size of RF tags used therein includes a plurality of RF tags (20, 90, 140, 230, 250) and an external reader (200). Each RF tag includes at least one resonant circuit (22, 92, 142, 231, 251) which is resonant at any one of a plurality of different frequencies, a receiver (34, 102, 152, 244, 264) for receiving an interrogation signal, and a control (36, 104, 154, 246, 266) responsive to receipt of an interrogation signal for causing its at least one resonant circuit to be resonant at selected ones of the different frequencies in a predetermined time sequence corresponding to a predetermined identification code. The external reader includes a detector (216, 218, 220, 222) for detecting the selected resonant frequencies of the RF tags and a decoder (226) for decoding the time sequence of the selected resonant frequencies for recovering the predetermined identification code.

39 Claims, 7 Drawing Sheets

RF TAGGING SYSTEM INCLUDING RF TAGS WITH VARIABLE FREQUENCY RESONANT CIRCUITS

FIELD OF INVENTION

The present invention generally relates to the field of RF tagging systems in which the resonant frequencies of resonant circuits on a tag are detected to recover an identification code. The present invention more particularly relates to an improved RF tagging system wherein an RF tag includes at least one resonant circuit having selectable capacitive and/or inductive components for being resonant at selected ones of different frequencies in a predetermined time sequence corresponding to a predetermined identification code and an external reader for detecting the selected resonant frequencies and decoding the time sequence of the selected resonant frequencies for recovering the predetermined identification code.

BACKGROUND OF THE INVENTION

RF tagging systems are well known in the art. In one such system, the existence of a single resonant circuit in a detection field or zone is utilized as an anti-theft type apparatus. Essentially, if an article having a single resonant frequency tag passes through a detection zone, an alarm is generated which indicates the unauthorized presence of store goods in the detection zone. Such resonant circuits have been constructed in accordance with standard printed circuit board techniques.

Some prior RF tagging systems have provided multiple different tuned (resonant) circuits on a tag so as to specifically identify the goods to which the tag is attached or the destination to which those goods should be directed. Such systems have been proposed for parcel or other article delivery systems wherein resonant circuits are utilized to provide a destination or sender code rather than printed bar codes.

The use of resonant circuit tagging is advantageous in that it is not subject to problems such as dirt obscuring a portion of a printed bar code and causing an error in determining the code associated with the article. Also, exact alignment of the tag with the detection system may not be required in RF tagging systems, since generally it is desired only to detect the presence of the resonant circuits somewhere in a broad detection zone. This can be achieved without precise alignment between the resonant circuit, the detection zone and the detection apparatus.

In order to enhance the utility of such systems, RF tags having multiple resonant circuits have been proposed to thereby increase the number of possible different identification codes. Prior systems utilizing multiple tuned circuit detection contemplate sequentially generating or gating each of the different resonant frequency signals to a transmitter antenna. Each different resonant frequency in a multiple frequency system is provided by a master oscillator circuit or transmitter whose output is essentially swept or stepped to sequentially provide each desired output frequency. Then, reflected energy from each of the tuned circuits is detected. Some frequency tagging systems look for absorption of RF energy by the resonant circuits during the transmission of the test frequency signals.

An improved RF tagging system is fully described in copending application Ser. No. 07/966,653, filed on Oct. 26, 1992, in the names of Sanjar Ghaem, Rudyard L. Istvan, and George L. Lauro, for RF Tagging System and RF Tags and Method, which application is assigned to the assignee of the present invention and fully incorporated herein by reference. The system there disclosed includes, as a significant feature, the simultaneous radiation of RF energy at a plurality of different frequencies in order to detect each of a plurality of different frequency resonant circuits which may be provided on a tag. Then a code signal indicative of which resonant frequencies for the tag resonant circuits were detected is provided. The above feature results in very fast detection of which resonant frequency circuits are provided on a tag in a detection zone.

The provision of multiple resonant circuits on RF tags, while providing a multiplicity of possible different identification codes, has many disadvantages. For example, multiple resonant circuits can occupy considerable RF tag surface area. This is especially the case with resonant circuits formed in a common plane. Hence, as the number of RF resonant circuits is increased, the tag size must also increase. As a result, the utility of prior tagging systems has been limited to those applications wherein large tags may be accommodated or where relatively few resonant circuits are needed on a tag.

Another disadvantage of tagging systems requiring multiple resonant circuits on each tag is in programming each tag to provide a particular identification code. Some prior RF tagging systems which contemplate printing a large number of different resonant frequency circuits on a tag create different codes by the selective adjustment of some of these resonant circuits. These systems have recognized that it may be necessary to adjust the resonant frequency provided for each circuit and such adjustment is generally contemplated as occurring by selective removal of metalization forming the resonant circuit. Some systems have recognized that step adjustments of the resonant frequency of such tuned circuits is desirable and this has been implemented by punching holes of predetermined diameters in capacitive elements of the resonant circuit to thereby reduce capacitance and increase the frequency of the resonant circuit. Such known prior techniques are not readily adaptable to mass production of customized resonant frequency codes by a post factory manufacturing operation. Many times, the actual code to be utilized will not be known until immediately prior to attaching a tag or label to an article.

A different approach to provide RF tag identification codes utilizes a single resonant circuit on an RF tag which is resonant at a single frequency. When the identification code of the RF tag is read, a transmitter continually illuminates the tag with RF energy at the single frequency. Electronic circuitry on the tag selectively renders the resonant circuit reflective and nonreflective in accordance with a time function. A reader monitors the reflected energy and decodes the time function to recover the identification code. This approach is also limited in the number of possible identification codes for a given read time because only a single resonant frequency is utilized.

Hence, there is a need in the art for an improved RF tag and RF tagging system utilizing the same which provide a greater number of potential identification codes than heretofore possible within given read time constraints. Such a system should provide the greater number of identification codes without requiring an increased number of resonant circuits on the RF tags.

Further, the RF tags of the improved system should be arranged for ready programming of the identification codes immediately prior to being associated with their respective goods or articles. Still further, such an improved system should be capable of being implemented with known and commercially acceptable technology and techniques to render the improved system commercially advantageous.

SUMMARY OF THE INVENTION

The present invention therefore provides an RF tag including resonant circuit means for being resonant at any one of a plurality of different frequencies, receiver means for receiving an interrogation signal, and control means responsive to receipt of an interrogation signal by the receiver means for causing the resonant circuit means to be resonant at selected ones of the different frequencies in a predetermined time sequence.

The resonant circuit means may include a capacitor and an inductor wherein the inductor has a plurality of taps and wherein the control means includes switch means for connecting selected ones of the taps in circuit with the capacitor in the predetermined time sequence.

The resonant circuit means may alternatively include an inductor and a plurality of capacitors, and wherein the control means includes switch means for connecting selected ones of the plurality of capacitors in circuit with the inductor in the predetermined time sequence.

The resonant circuit means may still further alternatively include an inductor and a variable capacitor in circuit with the inductor and wherein the control means includes means for varying the capacitance of the variable capacitor in the predetermined time sequence.

The present invention further provides an RF tag including a plurality of resonant circuits, each resonant circuit being resonant within a respective different frequency range and at any one of a plurality of different frequencies, receiver means for receiving an interrogation signal, and control means responsive to receipt of an interrogation signal by the receiver means for causing each of the resonant circuits to be resonant at selected ones of the different frequencies in a predetermined time sequence.

The present invention further provides an RF tagging system including an RF tag including resonant circuit means being resonant at any one of a plurality of different frequencies, receiver means for receiving an interrogation signal, and control means responsive to receipt of an interrogation signal by the receiver means for causing the resonant circuit means to be resonant at selected ones of the different frequencies in a predetermined time sequence corresponding to a predetermined identification code. The RF tagging system further includes an external reader including detecting means for detecting the selected resonant frequencies of the RF tag and decoding means for decoding the time sequence of the selected resonant frequencies for recovering the predetermined identification code.

The present invention further provides an RF tag including a plurality of resonant circuits, each resonant circuit being resonant at a different frequency, receiver means for receiving an interrogation signal, and control means responsive to receipt of an interrogation signal by the receiver means for causing the resonant circuits to be resonant in a predetermined time sequence.

The present invention still further provides an RF tagging system including an RF tag including a plurality of resonant circuits, each resonant circuit being resonant at a different frequency, receiver means for receiving an interrogation signal, and control means responsive to receipt of an interrogation signal by the receiver means for causing the resonant circuits to be resonant in a predetermined time sequence corresponding to a predetermined identification code. The RF tagging system further includes an external reader including detecting means for detecting the resonant frequencies of the resonant circuits, and decoding means for decoding the time sequence of the resonant frequencies for recovering the predetermined identification code.

DESCRIPTION OF THE PREFERRED EMBODIMENTS

Figure 1:
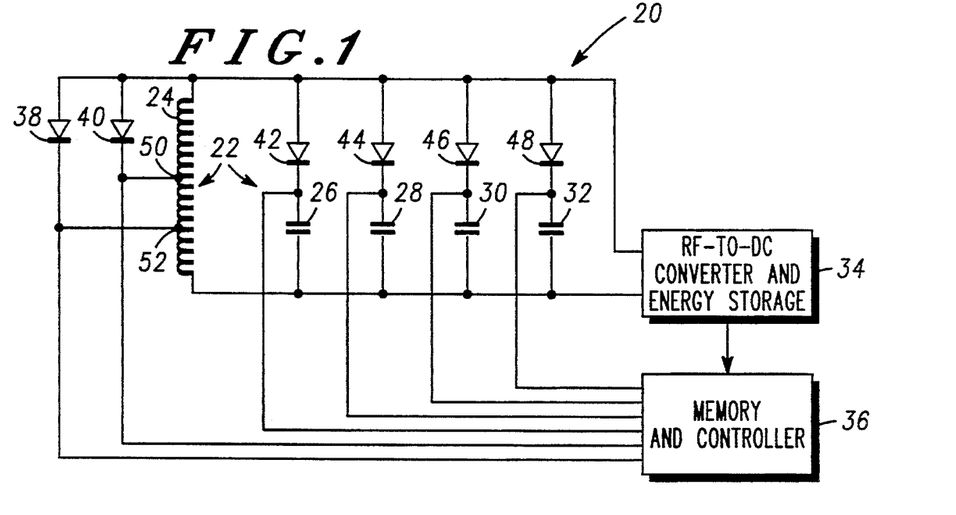
FIG. 1 is a circuit diagram of an RF tag embodying the present invention.

Referring now to FIG. 1, it illustrates in schematic circuit diagram form a first RF tag 20 embodying the present invention. A number of different RF tags embodying the present invention will be shown and described hereinafter which operate in a plurality of different frequency ranges. These frequency ranges include a 1.0 MHz frequency range, a 2.5 GHz frequency range, and a 5.7 GHz frequency range. The RF tag shown in FIG. 1 and the construction of the RF tag of FIG. 1 and as shown in FIGS. 2–6 is configured for operating in the first-mentioned frequency range of 1.0 MHz.

The RF tag 20 generally includes a resonant circuit means 22 including a multi-tapped inductor 24 and a plurality of capacitors 26, 28, 30, and 32. The RF tag 20 further includes a receiving means 34 for receiving an RF energy interrogation signal and converting the RF energy interrogation signal to stored electrical energy for powering the control electronics of the RF tag 20. To that end, the inductor 24 serves as the receiving antenna of the RF tag 20 for receiving the RF energy interrogation signal and thus the inductor 24 is coupled to the receiving means 34 which takes the form of an RF-to-DC converter. The RF-to-DC converter may be a full wave bridge rectifying circuit, for example, and may further include a capacitor for storing the electrical energy to power the RF tag 20. Such circuits are well known in the art.

The RF tag 20 further includes a control means 36 which selectively forward biases selected ones of a plurality of switching diodes 38, 40, 42, 44, 46, and 48 for selectively connecting the taps 50 and 52 of inductor 24 in circuit with selected combinations of the capacitors 26, 28, 30, and 32 in a predetermined time sequence. As a result, the resonant circuit means 22 is capable of being resonant at any one of a plurality of different frequencies within the frequency range of 1.0 MHz.

The control means 36 preferably includes a memory or shift register and a controller which may be programmed for causing the resonant circuit means 22 to be resonant at selected ones of the plurality of different frequencies in a predetermined time sequence to represent the particular identification code of the RF tag 20. As contemplated herein, such programming may be achieved immediately prior to the utilization of the tag 20.

As will be seen hereinafter, a preferred mode of operation for RF tag 20, and the other RF tags to be described herein, contemplates that responsive to the receipt of the interrogation signal and adequate storage of the electrical energy by the receiving means 34, the control means 36 first causes the resonant circuit means 22 to be sequentially resonant at each of the resonant frequencies in ascending order in frequency, which frequencies will be used to define its identification code. This will be referred to herein as the preamble which serves to permit an external receiver to tune to these resonant frequencies prior to the predetermined time sequence of the resonant frequencies (code portion). The preamble is then followed by the predetermined time sequence of the selected resonant frequencies defining the identification code of the tag 20. The reader then decodes the time sequence of the resonant frequencies to recover the identification code of the tag.

It is further contemplated herein that during the preamble operating portion and the code operating portion of the tag 20, that the external reader continuously transmits at the resonant frequencies utilized by the tag. Detection of the resonant frequencies is preferably performed by detecting absorption of the RF energy at the resonant frequencies using a grid-dip type of process as fully disclosed in the aforementioned cross-referenced application. Alternatively, detection of the resonant frequencies may be performed by detecting the reflection of the RF energy at the resonant frequencies in a manner well known in the art. However, the detection of energy absorption is preferred because this permits the use of less expensive dielectric materials and antenna structures to be utilized as compared to the materials and antenna structures required in the detection of reflected energy.

The preamble and code portions are repeated for a number of cycles until the RF tag 20 no longer has sufficient stored energy for switching the various inductance taps and capacitors in circuit. However, only a relatively few number of such cycles will be required for the reader to recover the identification code of the RF tag 20.

Figure 3:
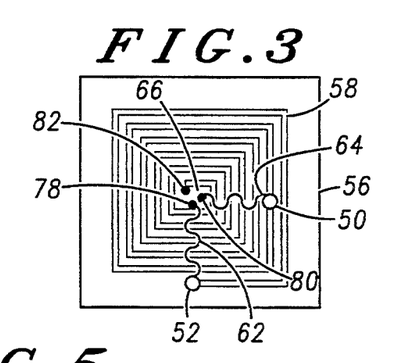
FIG. 3 is a top plan view of the RF tag of FIG. 1 at a further stage of its manufacture.
Figure 4:
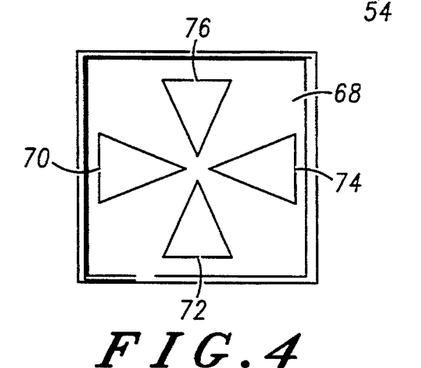
FIG. 4 is a top plan view of the RF tag of FIG. 1 at a still further stage of its manufacture.
Figure 5:
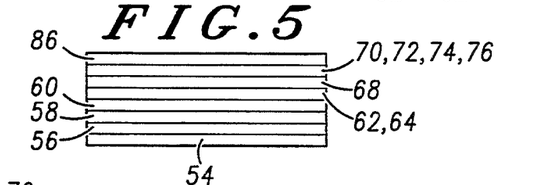
FIG. 5 is a side plan view, to an enlarged scale, illustrating the various layers of materials utilized in manufacturing the RF tag of FIG. 1.

FIGS. 2–6 illustrate the manner in which the RF tag 20 may be constructed in its manufacture. FIG. 5 illustrates the composite layered structure of the RF tag 20 and may be referred to in association with FIGS. 2, 3, and 4.

Figure 2:
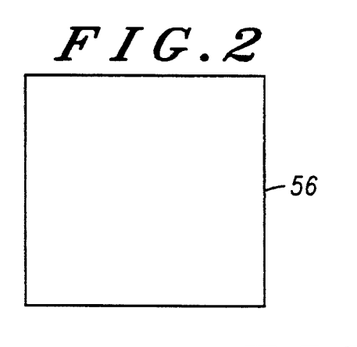
FIG. 2 is a top plan of the RF tag of FIG. 1 at an initial stage of its manufacture.

A first layer 54 is a conductive plane which is coated with an insulating dielectric material forming layer 56 as best seen in FIG. 2. A conductive spiral 58 is then formed on the dielectric layer 56 to form the inductor 24 as shown in FIG. 3. Another dielectric layer 60 is then applied over the conductive spiral 58. Portions of the dielectric layer 60 are then removed and conductive traces 62 and 64 are then applied over the dielectric layer 60 to form the taps 50 and 52 of the inductor 24. The traces 62 and 64 extend from the taps 50 and 52 to the center area 66 of the conductive spiral 58.

Another dielectric layer 68 is then applied to the entire exposed surface including the traces 62 and 64. Over this additional dielectric layer 68, a plurality of triangularly shaped conductive portions 70, 72, 74, and 76, as best seen in FIG. 4, are formed. The conductive portions 70, 72, 74, and 76 will form the capacitors 26, 28, 30, and 32 as illustrated in FIG. 1.

Figure 6:
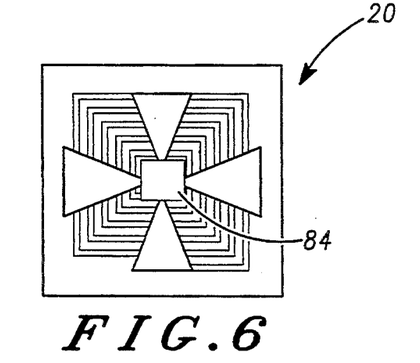
FIG. 6 is a top plan view of the RF tag of FIG. 1 upon completion of its manufacture.

Once the conductive portions 70, 72, 74, and 76 are formed, holes are etched through the various layers to expose contact pads 78, 80, and 82 (FIG. 3). An integrated circuit 84, as best seen in FIG. 6, is then bonded to the conductive portions 70, 72, 74, and 76 and electrically connected to the contact pads 78, 80, and 82. The integrated circuit 84 includes the RF-to-DC converter and energy storage device of the receiving means 34 and the memory and controller and the switching diodes 38, 40, 42, 44, 46 and 48 of the control means 36. Thereafter, the entire thus-completed structure is overcoated with a hard, protective coating 86 to complete the construction of the RF tag 20.

Figure 7:
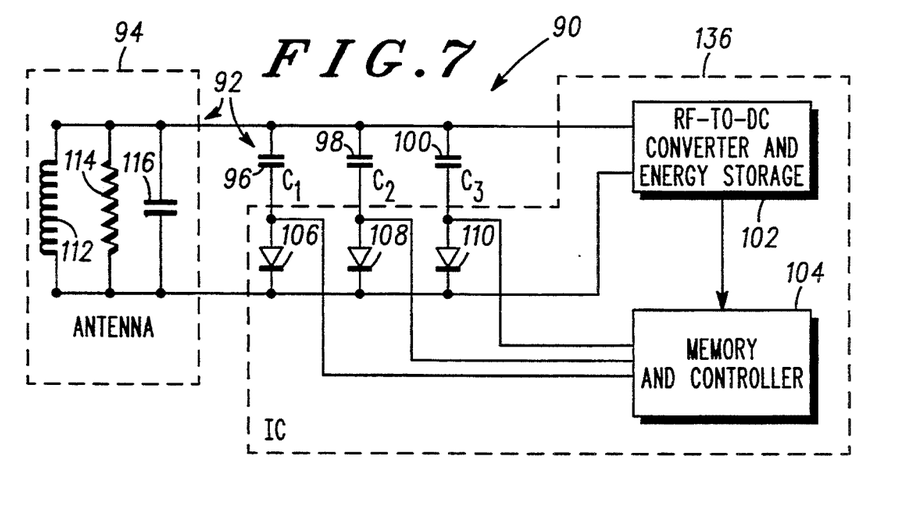
FIG. 7 is a circuit diagram of another RF tag embodying the present invention.

Referring now to FIG. 7, it illustrates, in schematic circuit form, another RF tag 90 embodying the present invention. The RF tag 90 generally includes a selectable resonant frequency resonant circuit 92 including an antenna structure 94 and a plurality of capacitors 96, 98, and 100. The RF tag 90 further includes a receiver means 102 and a control means 104. The RF tag 90 also includes a plurality of switching diodes 107, 108, and 110.

The antenna structure 94 provides inductance for the selectable frequency resonant circuit 92. To that end, the antenna structure 94 is illustrated as including a radiation resistance 114 and a reactance including an inductor 112 and a capacitor 116.

The switching diodes 106, 108, and 110 are rendered selectively conductive by the control means 104 which includes a memory and controller. When any one of the switching diodes is rendered conductive, its associated capacitor forms a parallel tuned resonant circuit with the inductance 112 of the antenna structure 94. The receiver means 102 includes an RF-to-DC converter and an energy storage device such as a capacitor. As in the previous embodiment, when an RF energy interrogation signal is received by the receiver means 102, which also utilizes the antenna structure 94, the RF-to-DC converter converts the RF energy interrogation signal to electrical energy which is stored in a storage capacitor for powering the control electronics of the RF tag 90.

In response to receipt of the RF energy interrogation signal, and after sufficient energy is stored, the control means 104 executes the preamble operation of the RF tag 90 by sequentially rendering diodes 106, 108, and 110 conductive so that the resonant circuit 92 is resonant at each one of three different resonant frequencies one at a time and in ascending order of resonant frequency. Once the preamble portion is executed, the control means 104 then causes the diodes 106, 108, and 110 to be selectively rendered conductive in a predetermined time sequence so that the resonant circuit is resonant at selected ones of the selectable different frequencies in a predetermined time sequence. As in the previous embodiment of FIG. 1, an external reader then will detect the selected resonant frequencies of the RF tag 90 and decode the time sequence of the selected resonant frequencies for recovering the predetermined identification code of the RF tag 90.

Figure 8:
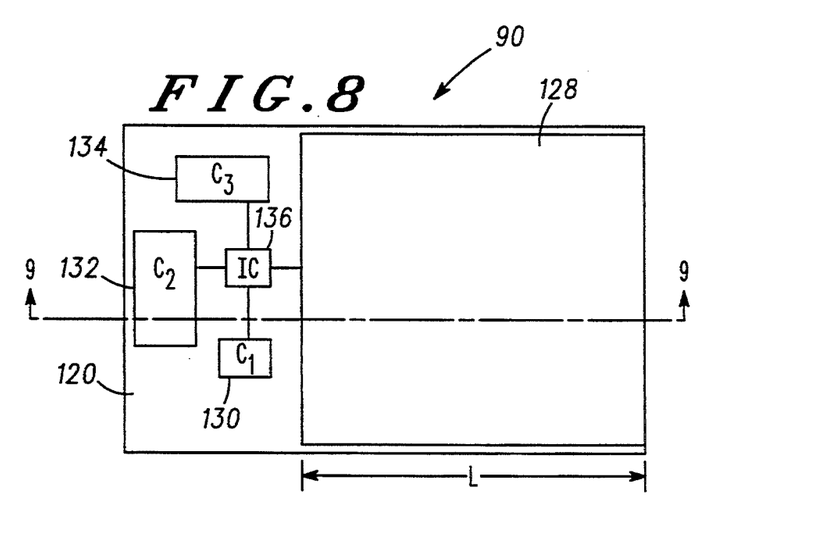
FIG. 8 is a top plan view of the RF tag of FIG. 7.
Figure 9:
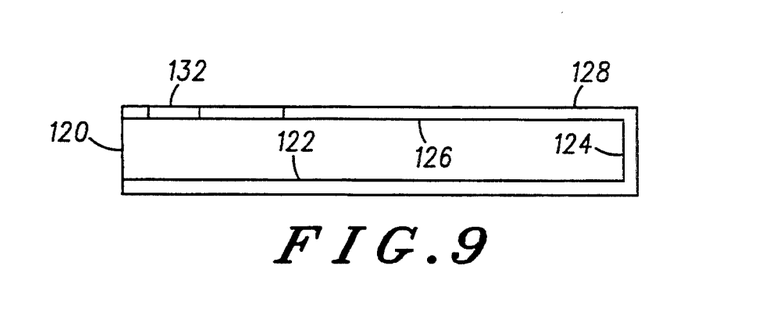
FIG. 9 is a cross-sectional view taken along lines 9—9 of FIG. 8 illustrating the substrate and metalization pattern on the substrate for the RF tag of FIG. 8.

FIGS. 8 and 9 illustrate the manner in which the RF tag 90 may be constructed in accordance with this embodiment of the present invention. The RF tag 90 includes a dielectric substrate 120. The bottom surface 122, a side margin 124, and an upper surface portion 126 of the substrate 120 is coated with a conductive material 128 to form a quarter-wave patch antenna for the antenna structure 94 illustrated in FIG. 7. On the upper portion 126 of the substrate 120 are formed conductive portions 130, 132, and 134 of different areas so as to form, along with the conductive material 128 on the bottom surface 122 of the substrate 120, the capacitors 96, 98, and 100 respectively. An integrated circuit 136, as shown in FIG. 8, is then bonded in electrical connection to the conductive material 128 and the conductive portions 130, 132, and 134 to complete the RF tag 90. The integrated circuit 136 includes the RF-to-DC converter and energy storage of receiver means 102, the memory and controller of control means 104, and the switching diodes 106, 108, and 110.

The RF tag 90 illustrated in FIGS. 7-9 may be utilized in the aforementioned 2.5 GHz or 5.7 GHz frequency ranges. For operation in the 5.7 GHz range, for example, the dimension "L" (FIG. 8) may be slightly less than 7.6 mm and the dielectric constant of the substrate 120 would preferably be 3.0 if a quarter wave antenna is desired. For an open (half wave) patch antenna, the conductor 128 should not cover side margin 124 and the dimension L should be on the order of 15.2 mm. Such patch antennas are well known in the art.

Figure 10:
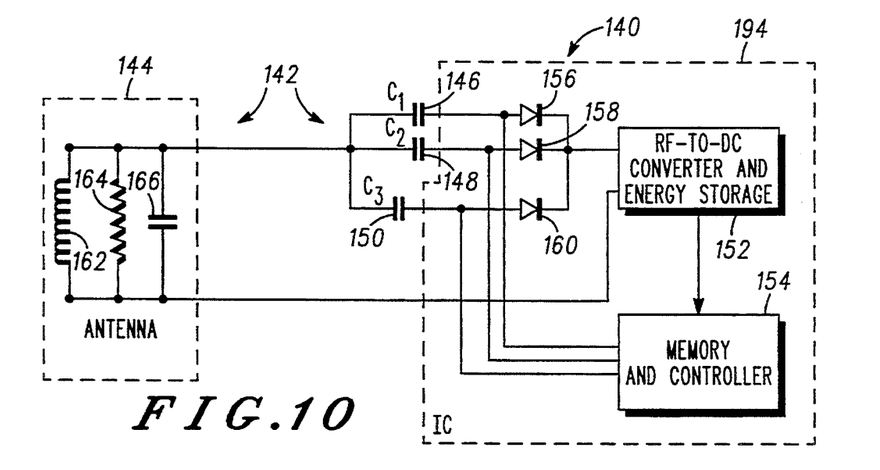
FIG. 10 is a circuit diagram of another RF tag embodying the present invention.

Referring now to FIG. 10, it illustrates in schematic circuit diagram form another RF tag 140 embodying the present invention. The RF tag 140 includes a selectable resonant frequency resonant circuit 142 including an antenna structure 144 and a plurality of capacitors 146, 148, and 150. The RF tag 140 also includes a receiver means 152 which includes an RF-to-DC converter and an energy storage device and a control means 154 which includes a memory and controller. The RF tag 140 still further includes a plurality of switching diodes 156, 158, and 160.

The antenna structure 144, as in the embodiment of FIG. 7, provides the inductance for the selectable frequency resonant circuit 142. To that end, the antenna structure 144 is represented as including a radiation resistance 164 and a reactance including an inductor 162 and a capacitor 166.

As will be noted from FIG. 10, when the switching diodes 156, 158, and 160 are selectively rendered conductive, they connect their associated capacitors 146, 148, and 150 in circuit with the inductor 162 to form a series tuned resonant circuit. Each of the capacitors 146, 148, and 150 has a different capacitance. As a result, the resonant circuit 142 of the RF tag 140 is capable of being resonant at any one of three different frequencies.

As in the previous embodiments, the antenna structure 144 also serves as the antenna for the receiving means 152. To that end, the antenna structure 144 is coupled to the receiving means 152.

When the receiving means 152 receives an RF energy interrogation signal, the RF-to-DC converter of the receiver means 152 converts the RF energy interrogation signal to electrical energy which is then stored in a storage device, such as a capacitor. When sufficient energy is stored in the receiver means 152, the control means 154 which includes a memory and controller will cause the RF tag 140 to execute the preamble of the RF tag in a manner as previously described in connection with the embodiments of FIGS. 1 and 7. Following the preamble, the control means 154 renders selected ones of the switching diodes 156, 158, and 160 conductive in a predetermined time sequence defined by the identification code of the RF tag 140.

Figure 11:
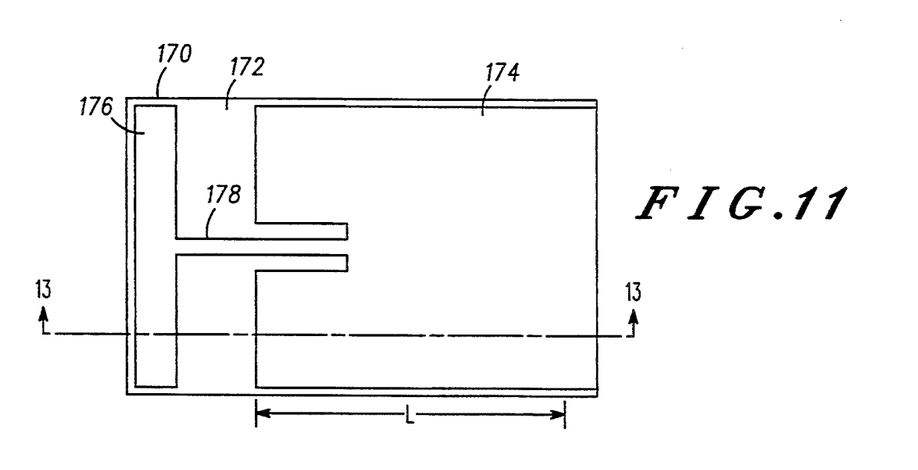
FIG. 11 is a top plan view of the RF tag of FIG. 10.
Figure 12:
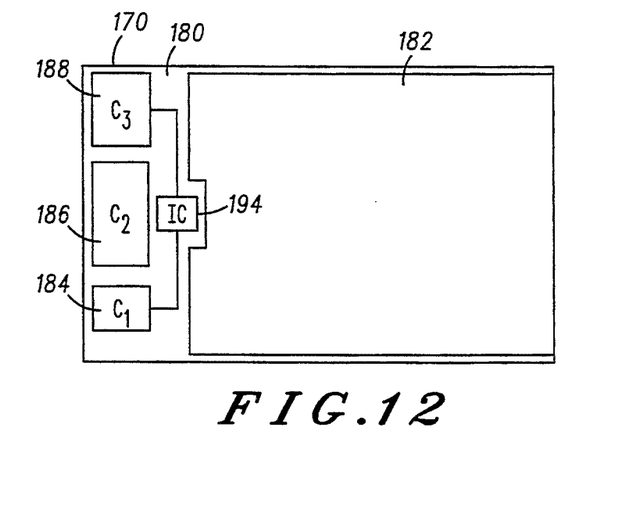
FIG. 12 is a bottom plan view of the RF tag of FIG. 10.
Figure 13:
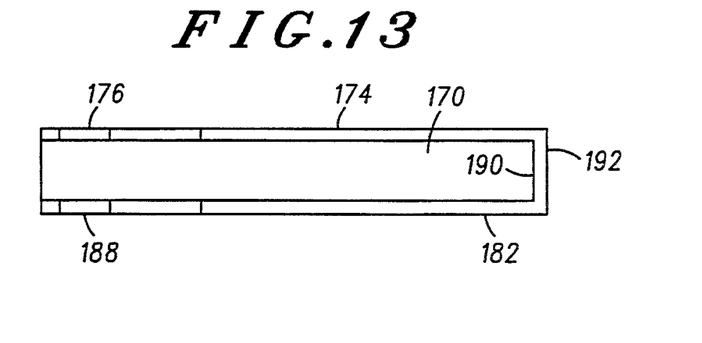
FIG. 13 is a cross-sectional view taken along lines 13—13 of FIG. 11 illustrating the substrate and the metalization pattern on the substrate for the RF tag of FIG. 10.

The RF tag 140 may be constructed as illustrated in FIGS. 11-13. In FIG. 11, the upper surface 172 of an electrically insulating dielectric substrate 170 is provided with a relatively large area conductive portion 174, a first conductive strip 176, and an interconnect strip 178. As may be best seen in FIG. 12, the bottom surface 180 of the dielectric substrate 170 is provided with another large area conductor 182 which substantially overlaps the conductive area 174 on the upper surface 172 and three discrete conductive portions 184, 186, and 188 which overlie the conductive strip 176 on the upper surface 172 of the substrate 170. The conductive portions 184, 186, and 188 along with the conductive strip 176 form the capacitors 146, 148, and 150 respectively. The side margin 190 of the substrate 170 is also covered with conductive material 192 to connect the conductive portions 174 and 182 together to form a quarter wave patch antenna. A half wave antenna may be formed as previously described if desired.

Lastly, an integrated circuit 194, as shown in FIG. 12, is bonded to the interconnects of the conductive portions 182, 184, 186, and 188 to complete the RF tag 140. As in the embodiment of FIG. 7, the integrated circuit includes the RF-to-DC converter and energy storage device of receiver means 152, the memory and controller of control means 154, and the switching diodes 156, 158, and 160.

Figure 14:
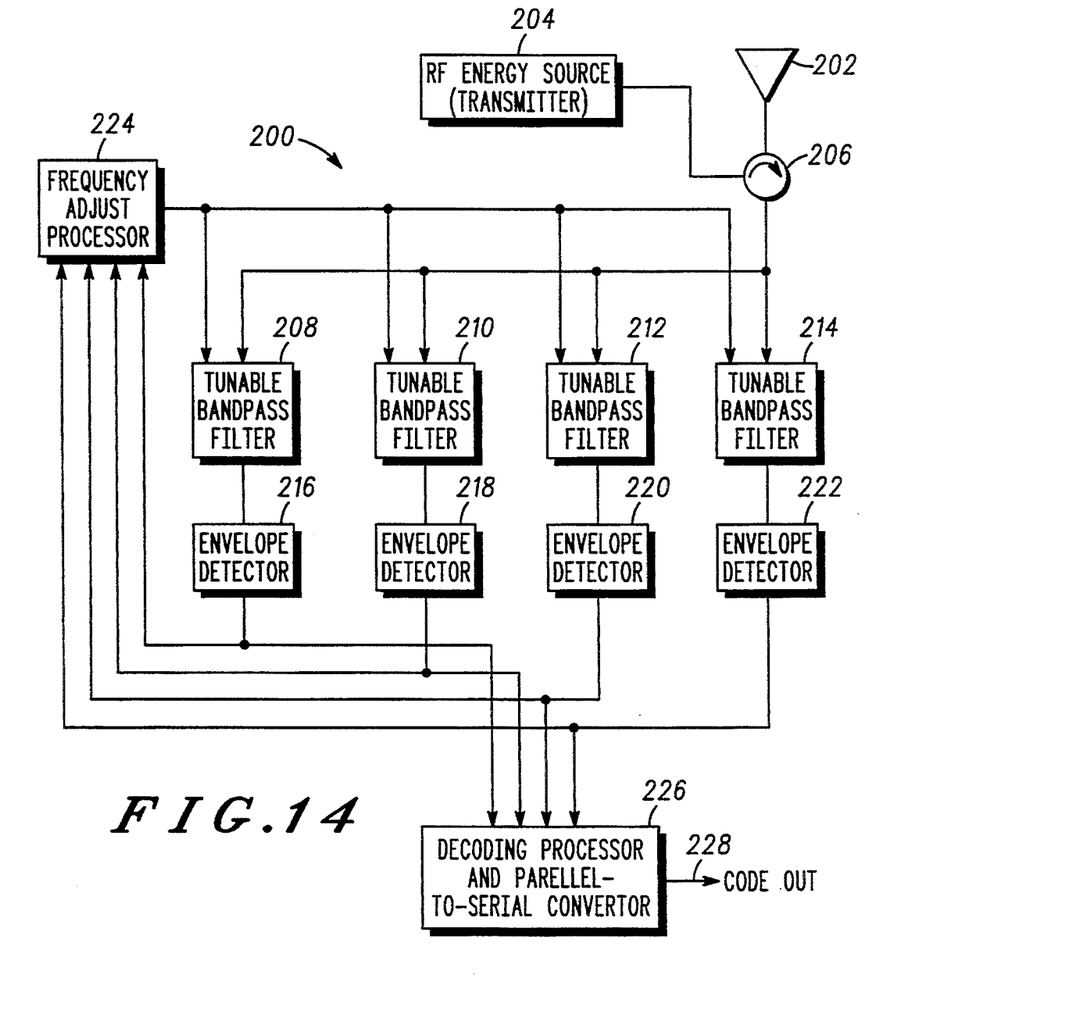
FIG. 14 is a schematic block diagram of a reader embodying the present invention and which may be utilized in association with the RF tags of FIG. 1, FIG. 7, and FIG. 10.

Referring now to FIG. 14, it is a block diagram of an external reader which may be utilized for interrogating and recovering the identification code of any of the RF tags embodying the present invention and described herein. The reader 200 includes an antenna 202, an RF energy transmitter 204, a circulator 206, and a plurality of tunable band pass filters 208, 210, 212, and 214. The reader 200 further includes a plurality of envelope detectors 216, 218, 220, and 222, a frequency adjust processor 224, and a decoding means 226.

The RF transmitter 204 may be a sweep transmitter which continuously sweeps through all of the frequencies to which the resonant circuits of the RF tags may be resonant. Alternatively, the RF transmitter may be a stepped frequency transmitter which incrementally steps through all of the resonant frequencies to which the resonant circuits of the RF tags may be resonant. As a further alternative, the RF transmitter may be of the type as disclosed in the aforementioned cross-referenced application which simultaneously transmits at all of the frequencies to which the resonant circuits of the RF tags may be resonant.

The circulator 206 permits the RF energy from the transmitter 204 to be radiated from the antenna 202 while precluding the RF energy from the RF transmitter 204 from reaching the other components of the reader 200 such as the tunable band pass filters and the envelope detectors.

As illustrated, four tunable band pass filters and four envelope detectors are illustrated to permit the recovery of an identification code of an RF tag which has a resonant circuit capable of being resonant at any one of four different frequencies. Each of the tunable band pass filters 208, 210, 212, and 214 are coupled to the antenna 202 through the circulator 206 and to a respective one of the envelope detectors 216, 218, 220, and 222. The outputs of the envelope detectors form inputs to the decoding means 226 and to the frequency adjust processor 224. The output of the frequency adjust processor is in turn coupled to an input of each of the tunable band pass filters 208, 210, 212, and 214.

As previously mentioned, the reader 200 preferably detects the resonant frequencies of the RF tag resonant circuits by detecting absorption of the RF energy by the resonant circuits. The tunable band pass filters 208, 210, 212, and 214 tune the reader to each of the resonant frequencies of the tags and the envelope detectors 216, 218, 220, and 222 detect for the absorption of the RF energy by the RF tags.

The decoding means 226 preferably includes a decoding processor and parallel-to-serial converter which determines from the outputs of the envelope detectors 216, 218, 220, and 222 the time sequence of the resonant frequencies of the RF tags. The decoding processor decodes the time sequence of the selected resonant frequencies of the RF tags for recovering the identification codes of the RF tags which are outputted by the parallel-to-serial converter at an output 228.

Figure 15:
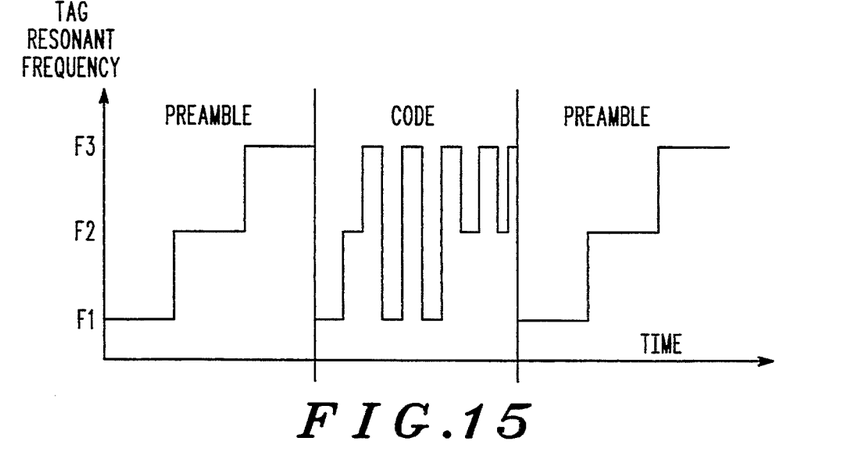
FIG. 15 is a graph illustrating resonant frequency versus time and depicting a preferred manner of operation of the RF tags embodying the present invention.

In operation, and in making reference to FIG. 15, when the RF transmitter 204 of the reader 200 begins to transmit to an RF tag, when the RF tag has converted the RF energy interrogation signal and has stored sufficient electrical energy, it enters its preamble mode to thereby be resonant at each of its resonant frequencies for some period of time and in ascending order of resonant frequency. As depicted in FIG. 15, the RF tag being interrogated will be resonant at any one of three different frequencies in defining its identification code.

During the preamble, during the time in which the RF tag is resonant at each of its resonant frequencies, each tunable band pass filter and its associated envelope detector will provide an output to the frequency adjust processor associated with a given one of the resonant frequencies. The frequency adjust processor 224 in turn causes each tunable band pass filter to be tuned to a respective one of the resonant frequencies of the RF tag. After the preamble is completed, the RF tag then, through its control means, is caused to be resonant at selected ones of its different resonant frequencies in a predetermined time sequence. By detecting RF energy absorption, the tunable band pass filters and envelope detectors provide inputs to the decoding means 226 indicating the frequencies at which the RF tag is resonant during each time period T. The decoding means 226 then decodes the time sequence of the selected resonant frequencies of the RF tag for recovering the predetermined identification code of the RF tag. The parallel-to-serial converter then causes the predetermined identification code to be outputted from the output 228 for completing the identification code recovery.

As indicated in FIG. 15, the RF tag alternates its preamble execution with its code execution for a number of cycles until the RF tag energy is depleted. The repetition of the preamble is advantageous because it permits RF tags of relaxed tolerances to be utilized while not degrading the recovery process. The repetition of the preamble is also advantageous in that environmental variations may cause shifts in the resonant frequencies of the RF tags from one cycle to the next. Hence, during the preamble periods, the band pass filters are rapidly scanned across the entire possible absorptive frequency range of the tag. The frequency adjust processor 224 measures the outputs of the envelope detectors and determines the resonant frequency set of the tag, which, in connection with FIG. 15, is three different frequencies. The frequency adjust processor 224 then sets the tunable filters to these frequencies with each filter being set to one of the resonant frequencies.

Figure 16:
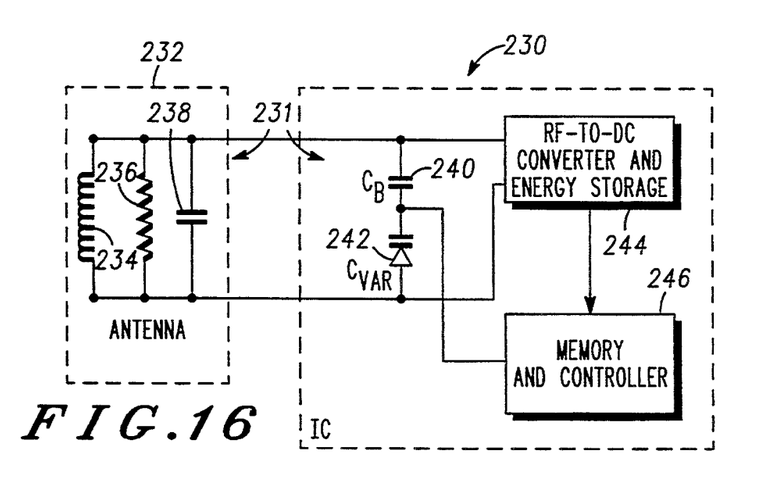
FIG. 16 is a schematic diagram of a further RF tag embodying the present invention.

Referring now to FIG. 16, it illustrates in schematic circuit diagram form a further RF tag 230 embodying the present invention. The RF tag 230 includes an antenna structure 232 having a radiation resistance 236 and a reactance including inductor 234 and a capacitor 238. The RF tag 230 further includes a variable frequency resonant circuit 231 including a fixed capacitor 240 and a variable capacitor 242. The variable capacitor 242 preferably takes the form of a varactor. The RF tag 230 also includes a receiving means 244 which includes an RF-to-DC converter and an energy storage device and a control means 246 which includes a memory and controller. As will be noted from FIG. 16, the antenna structure 232 is coupled to the receiver means 244 to permit the receiver means to receive an RF energy interrogation signal. The RF-to-DC converter of the receiver means converts the RF energy of the interrogation signal to electrical energy which is then stored in the energy storage device which may be a capacitor.

The inductance 234 of the antenna structure 232 forms the inductor for the variable frequency resonant circuit 231 which is parallel tuned by the capacitance of capacitor 240 and variable capacitor 242.

When the RF tag 230 has received the RF energy interrogation signal and has stored sufficient energy, the control means 246 varies the capacitance of the varactor 242 to provide different resonant frequencies in a predetermined time sequence corresponding to its predetermined identification code. Of course, the preamble modality may be utilized to advantage by the RF tag 230 as previously described.

Figure 17:
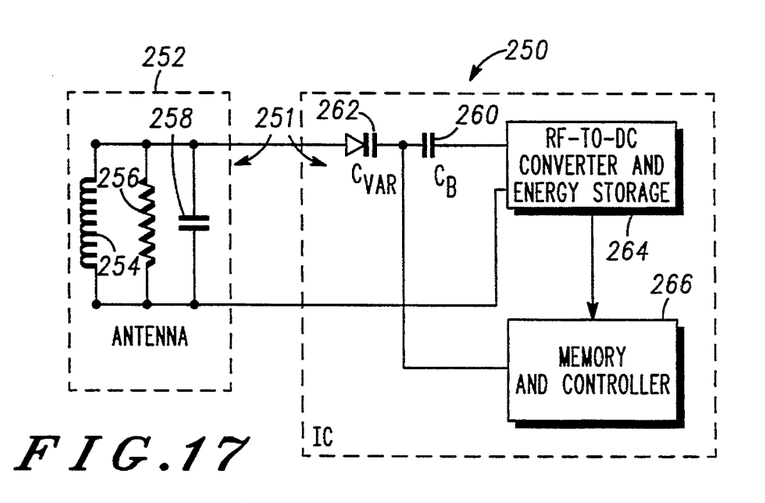
FIG. 17 is a schematic diagram of a still further RF tag embodying the present invention.

Referring to FIG. 17, it illustrates a still further RF tag 250 embodying the present invention. The RF tag 250 includes an antenna structure 252 which includes a radiation resistance 256 and a reactance including inductor 254 and a capacitor 258. The RF tag 250 further includes a variable frequency resonant circuit 251 including a fixed capacitor 260 and a variable capacitor 262. Preferably, the variable capacitor 262 is a varactor. Lastly, the RF tag 250 includes a receiver means 264 and a control means 266.

As will be noted in FIG. 17, the combination of the fixed capacitor 260 and the varactor 262 series tunes the resonant circuit 251 with the inductance 254 of the antenna structure 252. Hence, when the control means 266 varies the voltage applied to the varactor 262, the resonant circuit 251 formed by the inductance 254 and the capacitors 260 and 262 will be resonant at any one of a plurality of different frequencies in a predetermined time sequence to define the identification code of the RF tag 250.

Figure 18:
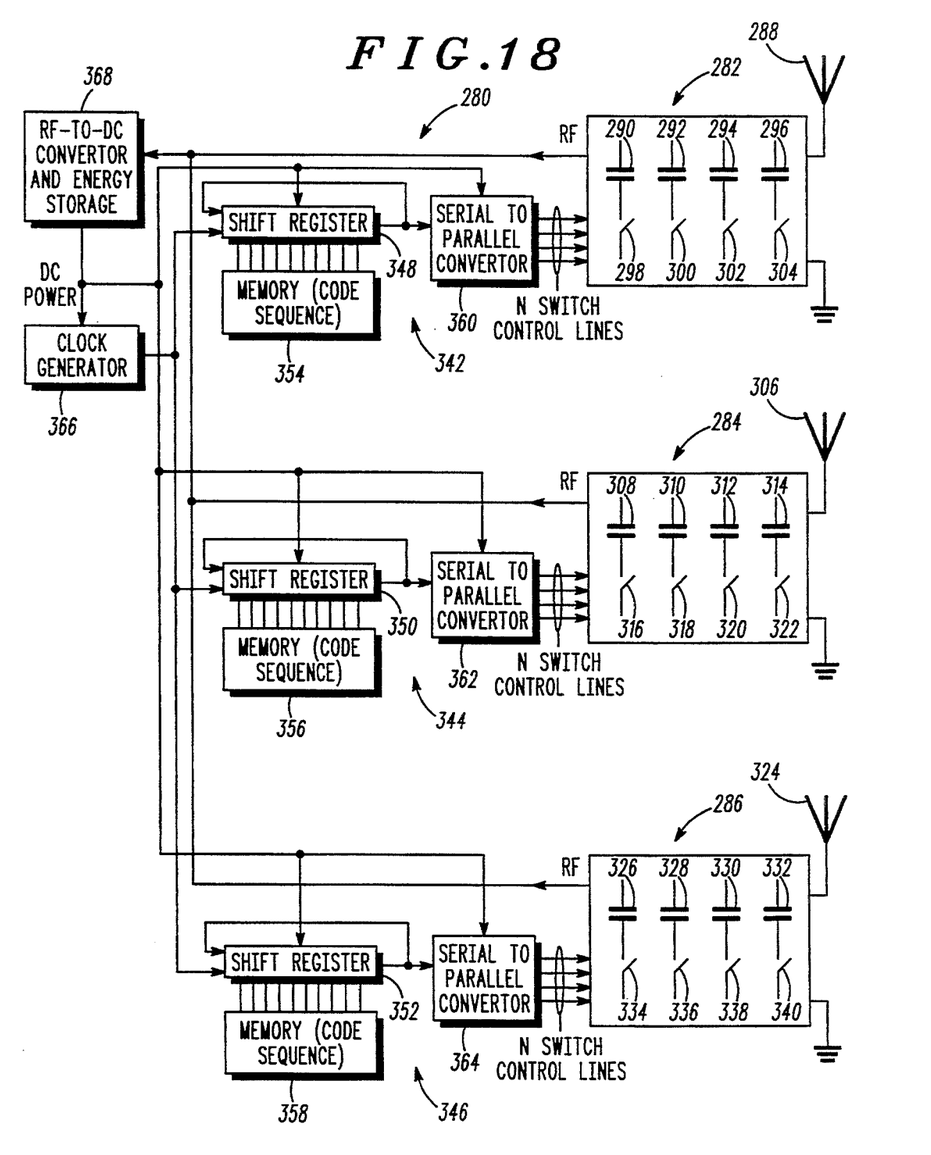
FIG. 18 is a schematic diagram of another RF tag embodying the present invention.

Referring now to FIG. 18, it illustrates in schematic circuit diagram form another RF tag 280 embodying the present invention. The RF tag 280 includes a plurality of resonant circuits 282, 284, and 286. Each of the resonant circuits 282, 284, and 286 is resonant within a respective different frequency range and at any one of a plurality of different frequencies. For example, in accordance with this preferred embodiment, resonant circuit 282 may be resonant within the 1 MHz frequency range, resonant circuit 284 may be resonant within the 2.5 GHz frequency range, and resonant circuit 286 may be resonant within the 5.7 GHz frequency range. To that end, resonant circuit 282 preferably includes the resonant circuit 22 illustrated in FIG. 1 wherein its corresponding antenna 288 is formed in the spiral configuration and its capacitors 290, 292, 294, and 296 are formed by the conductive patterns overlying the spiral configuration. The switches 298, 300, 302, and 304, which are shown schematically, preferably comprise the solid state switching diodes illustrated in FIG. 1.

Similarly, resonant circuits 284 and 286 take the form of either resonant circuit 92 of the RF tag of FIG. 7 or resonant circuit 142 of the RF tag of FIG. 10 with each of resonant circuits 284 and 286 including a fourth capacitor similarly constructed as illustrated in FIGS. 8 and 12 respectively. To that end, resonant circuit 284 will include a patch antenna 306, capacitors 308, 310, 312, and 314 and switches 316, 318, 320, and 322 wherein the switches preferably take the form of switching diodes. Similarly, resonant circuit 286 will include a patch antenna 324, capacitors 326, 328, 330, and 332, and switches 334, 336, 338, and 340 wherein the switches take the form of switching diodes.

Each of the resonant circuits 282, 284, and 286 is associated with its own control means for causing each of the resonant circuits 282, 284, and 286 to be resonant at selected ones of the different frequencies in a predetermined time sequence and within its corresponding frequency range. To that end, resonant circuit 282 is associated with control means 342, resonant circuit 284 is associated with control means 344, and resonant circuit 286 is associated with control means 346.

Each of control means 342, 344, and 346 includes a shift register 348, 350, and 352 respectively, a memory 354, 356, and 358 respectively, and a serial-to-parallel converter 360, 362, and 364. In controlling the switches of each resonant circuit, the corresponding memory provides the code sequence to its corresponding shift register which in turn provides its corresponding serial-to-parallel converter with an input serial bit stream which is converted by the serial-to-parallel converters for energizing one of four control lines. The control line being energized defines the switch to be closed for switching its corresponding capacitor in circuit with the inductance provided by its corresponding antenna.

A clock generator 366 is coupled to each of the shift registers 348, 350, and 352 for clocking the shift registers. A receiver means 368 which includes an RF-to-DC converter and energy storage device is coupled to each antenna 288, 306, and 324 for receiving the RF energy interrogation signal. The RF-to-DC converter converts the RF energy interrogation signal to electrical energy which is stored in the energy storage device such as a capacitor and provides the electrical energy to the clock generator 366 and to the control means 342, 344, and 346 associated with each of the resonant circuits 282, 284, and 286.

In operation, when the identification code of the RF tag 280 is to be recovered, a reader, such as reader 200 illustrated in FIG. 14, is employed for each resonant circuit. Hence, in accordance with this preferred embodiment, three such readers would be employed.

Each of the resonant circuits 282, 284, and 286, under control of its respective control means, provides a preamble as previously described. The code portion provided by each of the resonant circuits 282, 284, and 286 under control of its respective control means 342, 344, and 346 respectively may be operative in any one of three operating modes as contemplated herein.

In a first mode, the time sequence of the selected resonant frequencies of each of the resonant circuits 382, 384, and 386 corresponds to a different identification code. This mode of operation may be utilized where high security is required or where a large number of different identification codes are desired.

In a second mode, the time sequence of the selected resonant frequencies of each of the resonant circuits 282, 284, and 286 corresponds to a respective different portion of a predetermined identification code. This permits a rather long identification code to be utilized but which is divided in portions, wherein the portions of the identification code are read by the readers in parallel. This not only permits rather long identification codes to be utilized, but in addition, it greatly reduces the amount of time required to read such long identification codes.

The last mode contemplates that the time sequence of the selected resonant frequencies of all of the resonant circuits 282, 284, and 286 corresponds to the same identification code. This provides redundant recovery of the identification code from each of the resonant circuits to the end of providing enhanced reliability.

In any one of the aforementioned operating modes, it is likely that at least two of the resonant circuits will be resonant simultaneously but at different resonant frequencies. This is not detrimental to the system given the wide spacing in the respective frequency ranges in which the resonant circuits operate.

Figure 19:
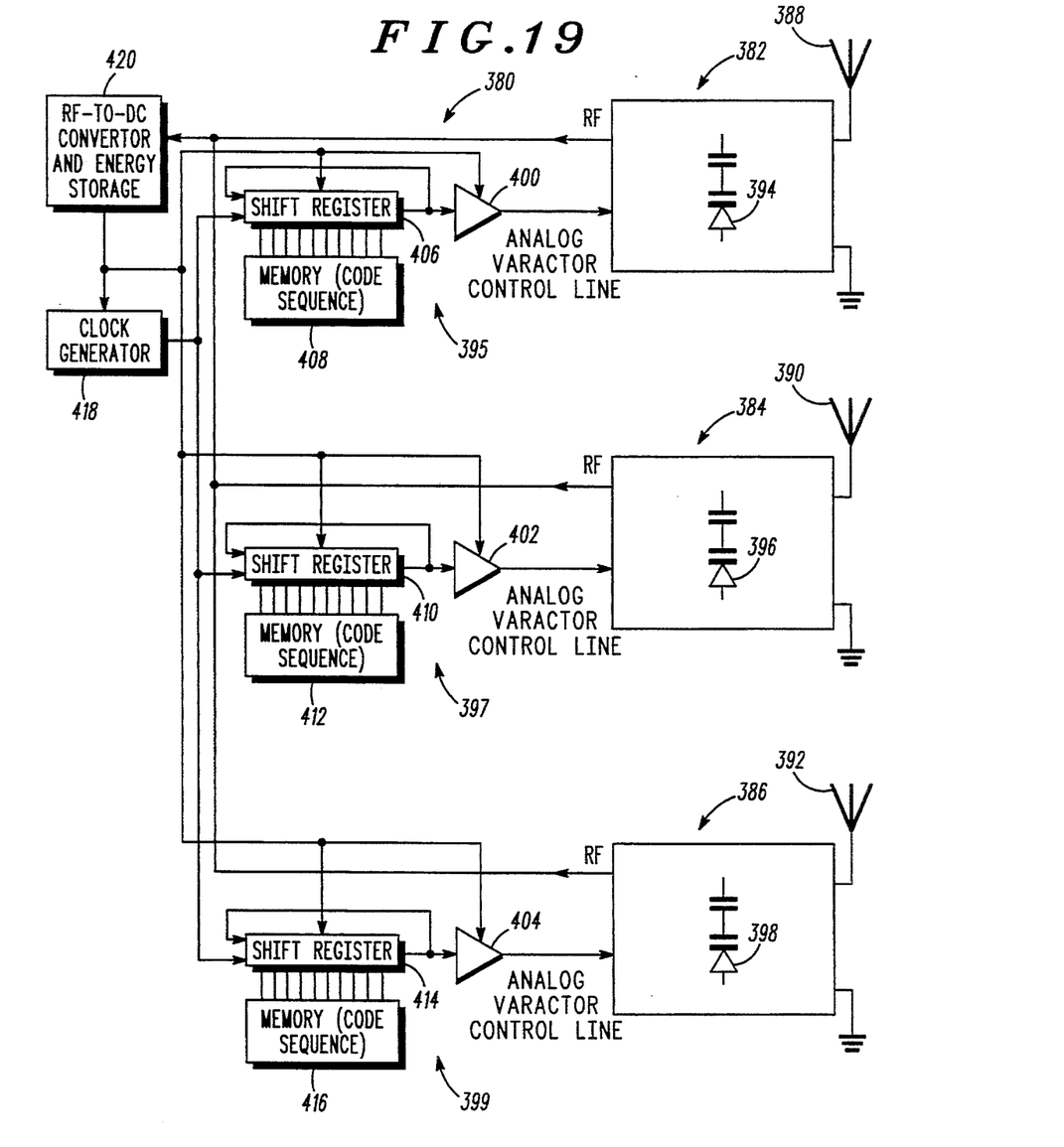
FIG. 19 is a schematic diagram of still another RF tag embodying the present invention.

Referring now to FIG. 19, it illustrates a still further RF tag 380 embodying the present invention in schematic circuit diagram form. Like the embodiment of FIG. 18, the RF tag 380 includes three resonant circuits 382, 384, and 386 with each resonant circuit being associated with an antenna 388, 390, and 392 respectively. Each of the resonant circuits 382, 384, and 386 as illustrated includes a variable capacitor in the form of a varactor 394, 396, and 398. Again, in accordance with this preferred embodiment, and like the embodiment of FIG. 18, each of the resonant circuits 382, 384, and 386 is resonant within a respective different frequency range and at any one of a plurality of different frequencies.

Each of the resonant circuits 382, 384, and 386 is also associated with its respective control means 395, 397, and 399 respectively. Each of the control means includes an amplifier 400, 402, and 404 for providing its corresponding varactor with a varying voltage for varying the resonant frequency of its respective resonant circuit in a predetermined time sequence. The control voltage applied to each of the varactors 394, 396, and 398 by the amplifiers 400, 402, and 404 respectively is determined by an analog shift register and a memory. To that end, control means 395 includes an analog shift register 406 and a memory 408, control means 397 includes an analog shift register 410 and a memory 412, and control means 399 includes an analog shift register 414 and a memory 416. The shift registers are clocked by a common clock generator 418.

A receiver means 420 is coupled to each of the antenna 388, 390, and 392. It includes an RF-to-DC converter and energy storage device for converting the RF energy interrogation signal to electrical energy and storing the electrical energy in a storage device such as a capacitor. The receiver means 420 provides the electrical energy to the clock generator 418 and to the control means 395, 397, and 399 associated with each of the resonant circuits 382, 384, and 386 respectively.

The operation of the RF tag 380 is essentially identical to the operation of the RF tag 280 of FIG. 18 and as described above. Again, three readers would be utilized for detecting and decoding the time sequence of the various resonant frequencies provided by the resonant circuits 382, 384, and 386. Additionally, while the resonant circuits 382, 384, and 386 have been illustrated schematically, it is to be understood that these resonant circuits may be configured as described with respect to FIGS. 16 and 17.

From the foregoing, it can be seen that the present invention provides a new and improved RF tagging system and new and improved RF tags for use therein. Because the identification codes are dependent upon both the selected resonant frequencies of the resonant circuits and the time sequence of the resonant frequencies, a large number of identification codes are rendered possible without unduly increasing the physical size of an RF tag. In addition, the various operational modalities provide for extreme flexibility for a given application. Those modalities provide for a high degree of security, a high degree of reliability, or an enhanced number of potential identification codes.

In addition to the foregoing, the RF tagging system of the present invention may be implemented with known technology providing the improved system with imminent commercial potential. In addition, the RF tags may be programmed to a particular identification code at its point of use. Such programming may be accomplished without having to physically alter the RF tags thereby increasing the convenience of using the RF tags of the present invention.

While particular embodiments of the present invention have been shown and described, modifications may be made, and it is therefore intended in the appended claims to cover all such changes and modifications which fall within the true spirit and scope of the invention.

We claim:

1. An RF tagging system comprising:

an RF tag including resonant circuit means being resonant at any one of a plurality of different frequencies within a frequency range, receiver means for receiving an interrogation signal, and control means responsive to receipt of said an interrogation signal by said receiver means for causing said resonant circuit means to be resonant at selected ones of said different frequencies in a predetermined time sequence corresponding to a predetermined identification code; and an external reader including detecting means for detecting said selected resonant frequencies of said RF tag, and decoding means for decoding the time sequence of said selected resonant frequencies for recovering said predetermined identification code.

2. An RF tagging system as defined in claim 1 wherein said external reader includes transmitting means for emitting RF energy at each of said plurality of frequencies.

3. An RF tagging system as defined in claim 2 wherein said detecting means includes absorption detecting means for detecting absorption of said RF energy for detecting said selected resonant frequencies.

4. An RF tagging system as defined in claim 3 wherein said absorption detecting means includes a plurality of absorption detectors, each said absorption detector corresponding to a respective one of said selected resonant frequencies.

5. An RF tagging system as defined in claim 4 wherein said detecting means includes variable frequency tuning means for tuning said absorption detectors to said selected resonant frequencies.

6. An RF tagging system as defined in claim 2 wherein said detecting means includes reflected energy detecting means for detecting reflection of said RF energy for detecting said selected resonant frequencies.

7. An RF tagging system as defined in claim 6 wherein said reflected energy detecting means includes a plurality of reflected energy detectors, each said reflected energy detector corresponding to a respective one of said selected resonant frequencies.

8. An RF tagging system as defined in claim 7 wherein said detecting means includes variable frequency tuning means for tuning said reflected energy detectors to said selected resonant frequencies.

9. An RF tagging system as defined in claim 1 wherein said control means first causes said resonant circuit means to be resonant at each one of said selected different frequencies one at a time and in a first given sequence responsive to receipt of said interrogation signal by said receiving means prior to causing said resonant circuit means to be resonant at said selected ones of said different frequencies in said predetermined time sequence corresponding to said predetermined identification code.

10. An RF tagging system as defined in claim 9 including a plurality of said RF tags and wherein the control means of each of said RF tags causes its respective resonant circuit means to be resonant at said selected frequencies and in said first given sequence.

11. An RF tagging system as defined in claim 10 wherein each control means of each of said RF tags causes its respective resonant circuit means to be resonant at selected ones of said different frequencies in a different time sequence whereby each said RF tag provides a different identification code.

12. An RF tagging system as defined in claim 9 wherein said given sequence is an ascending order in frequency of said selected resonant frequencies.

13. An RF tagging system as defined in claim 9 wherein said external reader includes transmitting means for emitting RF energy at each of said plurality of frequencies, wherein said detecting means includes a plurality of detectors, each said detector corresponding to a respective one of said selected resonant frequencies, and tuning means for tuning said detectors to said selected resonant frequencies responsive to and during said first given sequence.

14. An RF tagging system as defined in claim 1 wherein said external reader includes transmitting means for transmitting said interrogation signal.

15. An RF tagging system as defined in claim 1 wherein resonant circuit means includes a reactance, wherein said receiver means includes an antenna, and wherein said antenna provides said reactance.

16. An RF tagging system as defined in claim 1 wherein said resonant circuit means includes a plurality of resonant circuits, each said resonant circuit being resonant within a respective different frequency range and at any one of a plurality of different frequencies, and wherein said control means responsive to receipt of said interrogation signal by said receiver means, causes each of said resonant circuits to be resonant at selected ones of said different frequencies in a predetermined time sequence, and wherein said detecting means includes a plurality of detectors for detecting the selected resonant frequencies of each of said resonant circuits.

17. An RF tag comprising:
resonant circuit means for being resonant at any one of a plurality of different frequencies within a frequency range;
receiver means for receiving an interrogation signal; and
control means responsive to receipt of an interrogation signal by said receiver means for causing said resonant circuit means to be resonant at selected ones of said different frequencies in a predetermined time sequence.

18. An RF tag as defined in claim 17 wherein said resonant circuit means includes an inductor and a variable capacitor in circuit with said inductor, and wherein said control means includes means for varying the capacitance of said variable capacitor in said predetermined time sequence.

19. An RF tag as defined in claim 18 wherein said variable capacitor is a varactor.

20. An RF tag as defined in claim 17 wherein said resonant circuit means includes a capacitor and an inductor, said inductor having a plurality of taps, and wherein said control means includes switch means for connecting selected ones of said taps in circuit with said capacitor in said predetermined time sequence.

21. An RF tag as defined in claim 17 wherein said resonant circuit means includes an inductor and a plurality of capacitors, and wherein said control means includes switch means for connecting selected ones of said plurality of capacitors in circuit with said inductor in said predetermined time sequence.

22. An RF tag as defined in claim 17 wherein said resonant circuit means includes a reactance, wherein said receiver means includes an antenna, and wherein said antenna provides said reactance.

23. An RF tag comprising:
a plurality of resonant circuits, each said resonant circuit being resonant within a respective different frequency range and at any one of a plurality of different frequencies within mid range;
receiver means for receiving an interrogation signal; and
control means responsive to receipt of said interrogation signal by said receiver means for causing each of said resonant circuits to be resonant at selected ones of said different frequencies in a predetermined time sequence.

24. An RF tag as defined in claim 23 wherein at least one of said resonant circuits includes an inductor and a variable capacitor in circuit with said inductor, and wherein said control means includes, for said at least one resonant circuit, means for varying the capacitance of said variable capacitor in said predetermined time sequence.

25. An RF tag as defined in claim 24 wherein said variable capacitor is a varactor.

26. An RF tag as defined in claim 23 wherein said time sequence of said selected resonant frequencies of each said resonant circuit corresponds to a predetermined identification code and wherein the time sequence of said selected resonant frequencies of all said resonant circuits corresponds to the same identification code.

27. An RF tag as defined in claim 23 wherein the time sequence of said selected resonant frequencies of each of said resonant circuits corresponds to a different identification code.

28. An RF tag as defined in claim 23 wherein the time sequence of said selected resonant frequencies of each of said resonant circuits corresponds to a respective different portion of a predetermined identification code.

29. An RF tag as defined in claim 23 wherein each said resonant circuit includes a capacitor and an inductor, said inductor having a plurality of taps, and wherein said control means includes, for each said resonant circuit, switch means for connecting selected ones of said taps in circuit with said capacitor in said predetermined time sequence.

30. An RF tag as defined in claim 23 wherein each said resonant circuit includes an inductor and a plurality of capacitors, and wherein said control means includes, for each said resonant circuit, switch means for connecting selected ones of said plurality of capacitors in circuit with said inductor in said predetermined time sequence.

31. An RF tag as defined in claim 23 wherein each said resonant circuit includes an inductor and a variable capacitor in circuit with said inductor, and wherein said control means includes, for each said resonant circuit, means for varying the capacitance of said variable capacitor in said predetermined time sequence.

32. An RF tag as defined in claim 23 wherein at least one of said resonant circuits includes a capacitor and an inductor, said inductor having a plurality of taps, and wherein said control means includes, for said at least one resonant circuit, switch means for connecting selected ones of said taps in circuit with said capacitor in said predetermined time sequence.

33. An RF tag as defined in claim 23 wherein at least one of said resonant circuits includes an inductor and a plurality of capacitors, and wherein said control means includes, for said at least one resonant circuit, switch means for connecting selected ones of said plurality of capacitors in circuit with said inductor in said predetermined time sequence.

34. An RF tag as defined in claim 23 wherein each of said resonant circuits includes a reactance, wherein said receiver means includes an antenna, and wherein said antenna provides the reactance for at least one of said resonant circuits.

35. An RF tag as defined in claim 23 wherein each of said resonant circuits includes a reactance, wherein said receiver means includes a plurality of antennas, each said antenna being associated with a respective given one of said resonant circuits, and wherein each said antenna provides the reactance for its associated resonant circuit.

36. An RF tag comprising:
   a plurality of resonant circuits, each said resonant circuit being resonant at a different frequency;
   receiver means for receiving an interrogation signal; and
   control means responsive to receipt of said interrogation signal by said receiver means for causing said resonant circuits to be resonant at selected frequencies in a predetermined time sequence.

37. An RF tag as defined in claim 36 wherein said control means further causes at least two of said resonant circuits to be simultaneously resonant at respective different frequencies.

38. An RF tagging system comprising:
   an RF tag including a plurality of resonant circuits, each said resonant circuit being resonant at a different frequency, receiver means for receiving an interrogation signal, and control means responsive to receipt of said interrogation signal by said receiver means for causing said resonant circuits to be resonant at selected frequencies in a predetermined time sequence corresponding to a predetermined identification code; and
   an external reader including detecting means for detecting said resonant frequencies of said resonant circuits, and decoding means for decoding the time sequence of said resonant frequencies for recovering said predetermined identification code.

39. An RF tagging system as defined in claim 38 wherein said control means further causes at least two of said resonant circuits to be simultaneously resonant at respective different frequencies.

* * * * *